United States Patent
De Jong et al.

(10) Patent No.: US 6,553,351 B1
(45) Date of Patent: Apr. 22, 2003

(54) SYSTEM WITH AND METHOD OF CRYPTOGRAPHICALLY PROTECTING COMMUNICATIONS

(76) Inventors: Eduard Karel De Jong, Ankersmidplein63, NL-1506 CK Zaandam (NL); Christopher John Stanford, 19 Roundwoodlane, Herpenden, Herts AL5 3BW (GB)

(*) Notice: Subject to any disclaimer, the term of this patent is extended or adjusted under 35 U.S.C. 154(b) by 0 days.

(21) Appl. No.: 09/194,323

(22) PCT Filed: May 24, 1996

(86) PCT No.: PCT/NL96/00211

§ 371 (c)(1),
(2), (4) Date: Dec. 30, 1998

(87) PCT Pub. No.: WO97/45817

PCT Pub. Date: Dec. 4, 1997

(51) Int. Cl.⁷ .............................................. G06F 17/60
(52) U.S. Cl. .................................................. 705/69
(58) Field of Search ................................ 705/1, 13, 69, 705/71, 44, 16, 17, 41, 42, 43, 18, 21, 26, 27; 235/380, 375; 380/30

(56) References Cited

U.S. PATENT DOCUMENTS

| | | | | |
|---|---|---|---|---|
| 3,982,103 A | * | 9/1976 | Goldman | 705/41 |
| 4,259,720 A | * | 3/1981 | Cambell | 705/71 |
| 4,882,779 A | * | 11/1989 | Rahtgen | 705/72 |
| 4,996,711 A | | 2/1991 | Chaum | 380/30 |
| 5,036,461 A | * | 7/1991 | Elliott et al. | 705/44 |
| 5,131,039 A | | 7/1992 | Chaum | 705/69 |
| 5,218,637 A | | 6/1993 | Angebaud et al. | 713/173 |
| 5,305,383 A | * | 4/1994 | Gillou et al. | 705/66 |
| 5,337,358 A | * | 8/1994 | Axelrod et al. | 705/75 |
| 5,650,761 A | * | 7/1997 | Gomm et al. | 235/381 |
| 5,892,211 A | * | 4/1999 | Davis et al. | 235/380 |
| 5,930,363 A | * | 7/1999 | Stanford et al. | 235/379 |
| 5,987,138 A | * | 11/1999 | Gilbert et al. | 380/30 |
| 6,047,067 A | * | 4/2000 | Rosen | 705/68 |
| 6,205,435 B1 | * | 3/2001 | Biffar | 705/41 |

FOREIGN PATENT DOCUMENTS

| | | |
|---|---|---|
| EP | 0 507 669 | 10/1992 |
| EP | 0 924 667 A2 * | 6/1999 |
| GB | 2 241 414 | 8/1991 |

OTHER PUBLICATIONS

No author; Cyberpunks, e–money and the technologies of disconnection; summer 1993; Abstract from "Out of Control", Dialog file 47, pp. 1–4.*

* cited by examiner

*Primary Examiner*—Thomas A. Dixon
(74) *Attorney, Agent, or Firm*—Young & Thompson

(57) ABSTRACT

A value transfer system of at least one VCD (Value Carrying Device) (1) and at least one VAD (Value Accepting Device) (2), the VAD (2) having a memory (53) for storing at least an aggregate value (28) of previous accepted values and a device for transferring a claiming message (13), the VCD (1) having a memory (52) for storing at least a balance value (7) and a device for transferring a proving message (14), wherein the VAD (2) includes into the claiming message (13) a transaction value (20), a previous aggregate value (21) and a corresponding previously computed proving cryptogram (22), the VCD (1) computes and includes into the electronic message (14) a transaction proving cryptogram (35), computed on the basis of the previous aggregate value (21), the corresponding previously computed proving cryptogram (22) and the transaction value (20), and the VCD (1) computes the at least one transaction proving cryptogram (35) only if it has established the correctness of the received previous aggregate value (21) by using the corresponding previously computed cryptogram (22) and after it has reduced the balance value (7) with the transaction value (20).

25 Claims, 3 Drawing Sheets

VALUE TRANSFER PROTOCOL
ACCORDING TO INVENTION WITH SIGNATURE CRYPTOGRAPHY

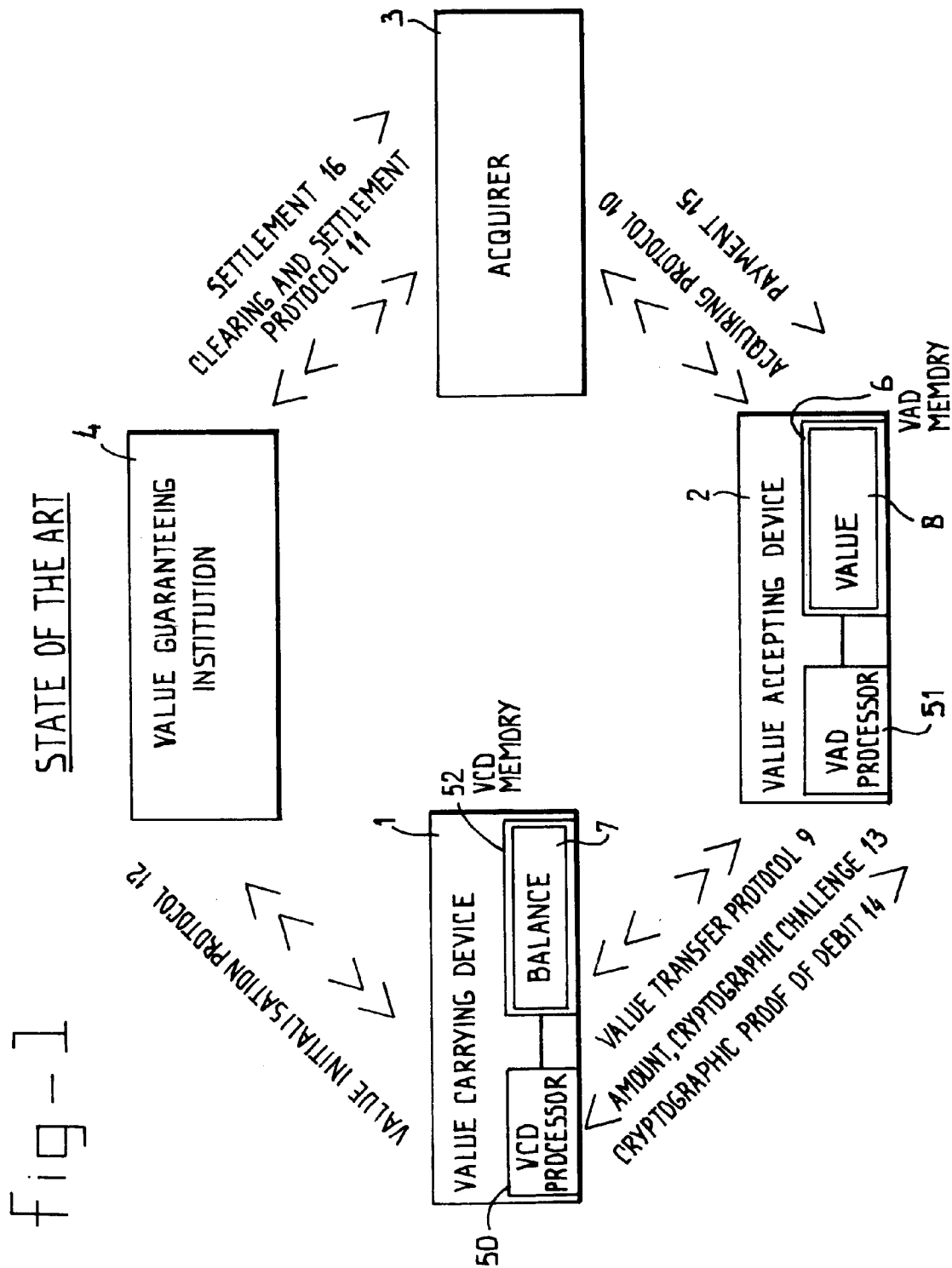

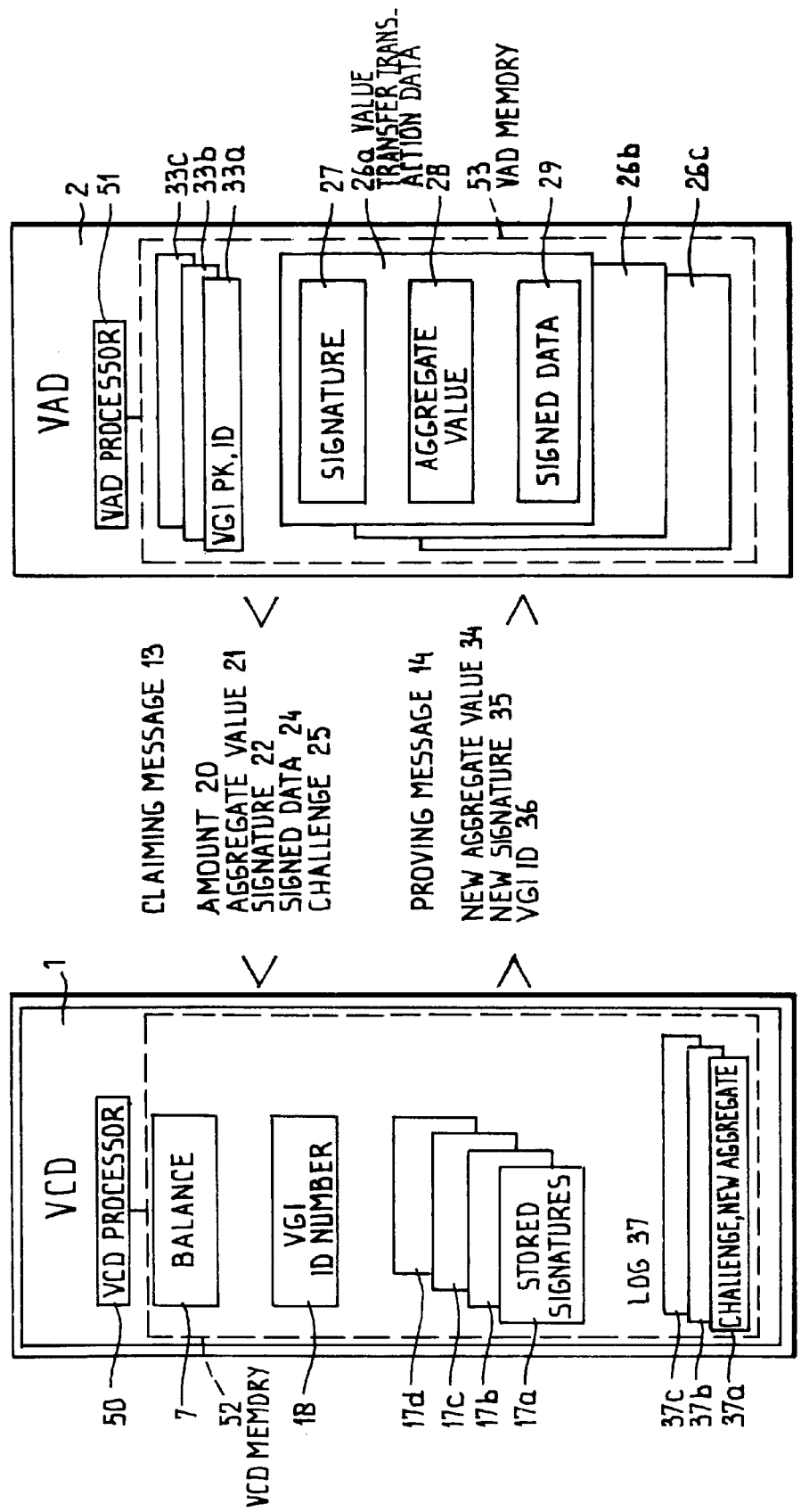

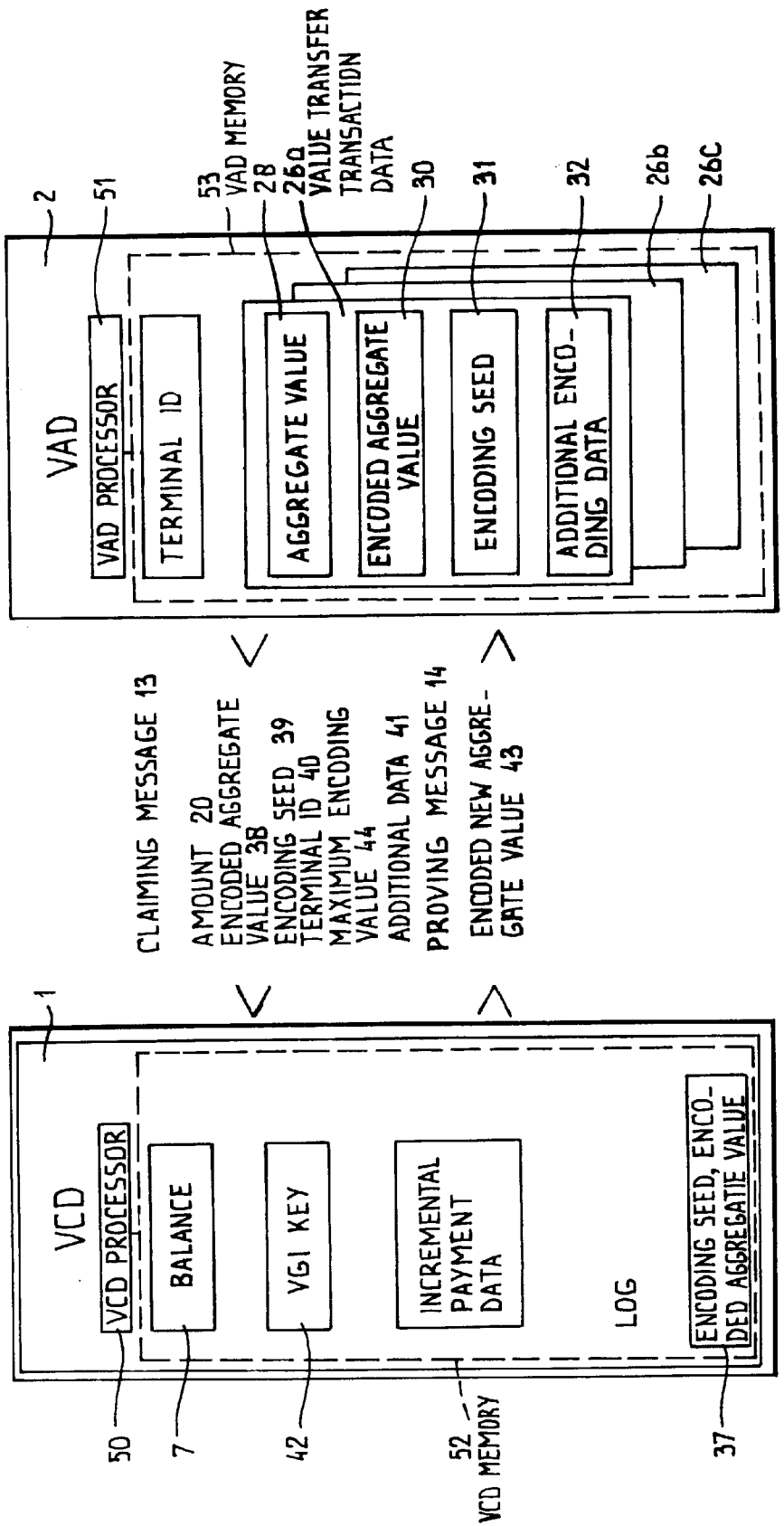

SYSTEM WITH AND METHOD OF CRYPTOGRAPHICALLY PROTECTING COMMUNICATIONS

The state of the art in electronic purses in adequately described in part II of the (draft) European Standard EN 1546. The description as contained in that document is sumarised here and schematically given in FIG. 1; the draft standard contains a more detailed description and explicitly indicates the potential multiplicity of parties involved in the protocols which aspects have been omitted here for clarity. See also European patent 0,421,808–B1.

Referring to FIG. 1, an electronic purse operates In that in return for payment from a holder of a Value Carrying Device 1. A Value Guaranteeing Institution 4 is responsible for securely loading Balance 7 held in Value Carrying Device memory 52 of the Value Carrying Device 1 with a value using a value initializing protocol 12. The Value Carrying Device 1 is provided with a Value Carrying Device processor 50 connected to memory 52.

For the purpose of a payment the Value Carrying Device 1 which has a current value indicated as balance 7 engages with a Value Accepting Device 2 using a value transfer protocol 9, The Value Carrying Device 1 may be a tamper resistant device such as a smart card or may contain such a device that at least protects the integrity of the balance 7; the tamper resistant feature of the balance 7 is indicated in FIG. 1 by the double lines surrounding the balance 7. The basis of the value transfer protocol consists of a first "claiming" message 13 from the Value Accepting Device 2 to the Value Carrying Device 1, fundamentally containing the amount to be transferred and optionally additional data which may possibly in part serve as a cryptographic challenge and a proving message 14 containing proof of debit of the balance 7. The cryptographic proof contained in the message 14 serves to authenticate the value transferred in the message and indirectly the correctness of processing inside the Value Carrying Device 1 and ultimately establishes a guarantee for refunding the transferred value by the Value Guaranteeing Institution 4. The Value Accepting Device 2 is provided with Value Accepting Device processor 51 connected to a Value Accepting Device memory 6. The Value Accepting Device processor 51 is, preferably, also tamper resistant.

The acceptance of the message depends on the verification by the Value Accepting Device 2 of the cryptographic proof contained in the message 14 upon which the Value Accepting Device 2 increases the value 8 held in its own secure storage 6. Alternative techniques may be used with equal result of accruing value in the Value Accepting Device 2, for instance one which allows value to be collected by storing every transaction individually in either secure or non secure storage in the Value Accepting Device. Such techniques may involve the exchange of more messages than those described in FIG. 2 which may contain additional data, but the net effect is the same: transfer of value. U.S. Pat. Nos. 4,996,711 and 5,131,039 of Chaum describe such possible protocols, mainly differing in the cryptographic techniques applied. These and other specific protocols are used in commercially available electronic purse smart card applications.

Periodically, for the purpose of recovering the values accepted from the Value Guaranteeing Institution 4, an Acquirer 3 is involved which may be an entity independent from the Value Guaranteeing Institution 4 or identical to it. The Acquirer 3 uses an acquiring protocol 10 to transfer information about the values accepted by the Value Accepting Device 2 during that period for storage and processing and as a result makes a payment 15 to the operator of the Value Accepting Device 2. The British patent application 9505397.1 (Transmo) describes a particular realisation of an acquiring protocol.

The Acquirer 3 may consolidate, by whatever means, value information from a multitude of Value Accepting Devices 2 and deduce the total value to be reclaimed from each Value Guaranteeing Institution 4 using a clearing and settlement protocol 11. As a result, a Value Guaranteeing Institution 4 makes a settlement 16 with the Acquirer 3 for the payments 15 made for the value issued by that particular institution which had been accepted by the Value Accepting Devices 2 as acquired by said Acquirer 3.

With electronic purse systems implemented according to the state of the art it is generally economically infeasible to store, communicate and electronically process individual transactions when they are in majority of small value, which is often the case. As a remedy, a tamper resistant security device 6. commonly known as "SAM" (=Security Application Module) that is provided as an integral component of every Value Accepting Device, is deployed into which individual payments are accumulated into a single value for subsequent processing by the Acquirer 3. Additionally the SAM is also used to hold security keys that when used in conjunction with a publicly known algorithm allow the Value Accepting Device 2 to verify in the value transfer protocol 9 the authenticity of the Value Carrying Device 1 and the value transferred; specifically to verify the correctness of the debit proof contained in message 14. The SAM 6 is thus a integral part of the security of the payment system and holds secret information common to the secret information held in each Value Carrying Device 1, it has to be secure against the revealing or alteration of its contents. If compromised by various forms of physical and or analytical attack, the SAM 6 can be made to reveal the secrets upon which the entire security of payment schemes using such techniques rely. These tamper resistance requirements for the SAM 6 adds to the complexity and cost of Value Accepting Device's, to increased complexity of security management and increases the exposure to risks of misuse of the payment system.

One could use public key cryptographic algorithms to protect the value transfer protocol in implementations of an electronic purse according to the state of the art which would obviate, in principle, the need for SAM's 6 as part of the Value Accepting Device 2 to authenticate the Value Carrying Device 1 and the value transferred. This restricts the exposure to risks of Misuse of the system. However, in general the amount of data required to be stored with each public key protected transaction is significantly large. The need to aggregate in the Value Carrying Device 1 is even greater than in alternative implementations. Again, where aggregation is required the Value Carrying Device 1 must contain a se cured component that can be trusted by the Value Guaranteeing Institution 4 or Acquirer 3 to perform the accumulation. The tamper resistance requirements for the Value Accepting Device 2 adds to the complexity and cost of the device and to increased complexity of security management in the system.

In purse systems implemented according to the state of the art the actual value transfer protocol 9 is complicated to ensure that failures in communications between Value Carrying Device 1 and Value Accepting Device 2 do not cause irrecoverable loss of value. Additional protocols may be implemented for recovery of value after interrupted communications. Fundamentally, with implementations according to the state of the art, the risk of irrecoverable loss of value can not be eliminated in full however complex the protocol. The added complexity in protocols needed to reach a sufficient level of practical reliable operation increases the implementation costs, increases the transaction duration and may lead to more complicated device usage handling, e.g. for explicit recovery protocols.

The object of the current invention is, firstly, to obviate the need for secure devices in Value Accepting Devices. secondly, to guarantee no irrecoverable loss of value, thirdly, to simplify the value transfer protocol, and fourthly, to make it technically and economically feasible to apply a single type of protocol for a wide range of electronic payment applications, with varying requirements in speed of transaction, means of communication and range of values to transfer. A further purpose of the current invention is to bring a level of privacy protection to rechargeable purse systems in a manner which before has only been possible with public key cryptography without the need for the lengthy and complex public key cryptographic computations.

The object of the present invention is obtained by a value transfer system comprising at least one Value Carrying Device and at least one Value Accepting Device being able to communicate with each other, the at least one Value Accepting Device comprising a Value Accepting Device memory for storing at least an aggregate value of previous accepted values and being arranged to transfer a claiming message representing at least a transaction value to said at least one Value Carrying Device, the at least one Value Carrying Device comprising a Value Carrying Device memory for storing at least a balance value and being arranged to transfer a proving message to said at least one Value Accepting Device, characterised in that the at least one Value Accepting Device is arranged to further include into the claiming message a previous aggregate value and a corresponding previously computed proving cryptogram;

the at least one Value Carrying Device is arranged to compute and include into the proving message at least one transaction proving cryptogram, computed on the basis of the previous aggregate value, the corresponding previously computed proving cryptogram and the transaction value, and the at least one Value Carrying Device is arranged to compute the at least one transaction proving cryptogram only if it has established the correctness of the received previous aggregate value by using said corresponding previously computed cryptogram and after it has reduced the balance value with the transaction value.

Risk exposure limitation can easily be obtained by having keys shared by small sets of Value Carrying Devices instead of global key sharing with the associated risk of full system collapse in the event of key compromise. A system using keys shared by small sets is claimed in claim 2.

An other way of risk limitation may easily be obtained by reducing the maximum value of the resulting aggregate value, where the acquiring protocol resets the value. A system directed to such a risk limitation is claimed in claim 3.

Still, an other way of risk limitation may be easily obtained by reducing the maximum value of each individual transfer. A system directed to such a way of risk limitation is claimed in claim 4.

Still, a further way of risk limitation may be easily obtained by reducing the maximum number of transfers, that may be accepted by a device, where the acquiring protocol resets the count. A system directed to such a way of risk limitation is claimed in claim 5.

The present invention is also directed to a Value Carrying Device as part of the system defined above, which is arranged to communicate with at least one Value Accepting Device, said Value Carrying Device comprising a Value Carrying Device memory for storing at least a balance value and being arranged to receive a claiming message representing at least a transaction value and to transfer a proving message to said at least one Value Accepting Device, characterised in that the Value Carrying Device is arranged to receive through the claiming message a previous aggregate value and a corresponding previously computed proving cryptogram:

compute and include into the proving message at least one transaction proving cryptogram, computed on the basis of the previous aggregate value, the corresponding previously computed proving cryptogram and the transaction value, and compute the at least one transaction proving cryptogram only if it has established the correctness of the received previous aggregate value by using said corresponding previously computed cryptogram and after it has reduced the balance value with the transaction value.

Moreover, the present invention is directed to a Value Accepting Device as part of the system defined above, which is arranged to communicate with at least one Value Carrying Device, said Value Accepting Device comprising a Value Accepting Device memory for storing at least an aggregate value of previous accepted values and being arranged to transfer a claiming message representing at least a transaction value to said at least one Value Carrying Device end to receive a proving message from said at least one Value Carrying Device, characterised in that said Value Accepting Device is arranged to further include into the claiming message a previous aggregate value and a corresponding previously computed proving cryptogram in order to allow the at least one Value Carrying Device to compute and include into the proving message at least one transaction proving cryptogram, computed on the basis of the previous aggregate value, the corresponding previously computed proving cryptogram and the transaction value, and to allow the at least one Value Carrying Device to compute the at least one transaction proving cryptogram only if it has established the correctness of the received previous aggregate value by using said corresponding previously computed cryptogram and after it has reduced the balance value with the transaction value.

The present invention also relates to a method of cryptographically protecting a communication or a sequence of communications between a transmitter and a receiver, and of establishing a monotonic order in which messages are communicated or a strict monotonic change of numeric values contained in communicated messages characterised in that said communications include at least one number representing said monotonic order or representing said numeric values and cryptograms computed from the at least one number in an encoding using a "Peano" number scheme as follows:

choosing a discrete maximum value for the encoding;

selecting a cryptographic one-way function that maps starting numbers consisting of a predetermined number of bits to object numbers consisting of the same predetermined number of bits a functional application to a number being defined as "successor operation" in the Peano number scheme;

selecting a random number consisting of said predetermined number of bits as zero element in the Peano number scheme;

determining a value encoded in a number as the value of a Peano number determined by repeated functional applications of the one-way function starting with the zero element until a result of the functional application of the one-way function equals a code number to be decoded, wherein a code word is found not to be a valid encoding if none of the results of applying repetitively for a number of times equal to the chosen discrete maximum value the cryptographic one-way function starting with the selected zero element equals the code word:

and in that the at least one transmitter is arranged to select said random number while keeping said random number confidential in order to warrant unconditional monotonicity of the message order or of the numeric values communicated.

Such a method effectively uses cryptographic encoding of monotonous series of data in one-way counters. Thus, secret keys used for encoding are based on a one-way scheme and can never be revealed by using reverse engineering techniques on data alone. Therefore, data can very securely be transmitted between a Value Carrying Device and a Value Accepting Device, One possible value transfer system based on the method defined above and using one-way counters based on cryptograms stored in the Value Accepting Device memory, is claimed in claim 11. This embodiment improves over the method of plain cryptographic prooving cryptogram computation in that it allows use of simpler and cheaper shared key cryptography to prove a transfer where the value accepting device need not have available the secret to verify the proof. In addition, it provides a basis for efficient verifiable protection in the acquiring protocol.

An other possible embodiment of the method defined above is claimed in claim 13. The system of claim 13 does not need any additional cryptogram. It is more efficient than the embodiment mentioned above in that it reduces the amount of data to be transferred. Moreover, it is stronger as it does not have any confidential data stored in the Value Accepting Device. Moreover, it more elegantly includes the length (the discrete maximum value) of the one-way counter and additional data in the proving cryptogram.

An advantageous value transfer system, which is especially suited for payments in units. e.g., in telephone systems, toll road systems, public transport systems or in systems for consulting WWW pages, is claimed in claim 16:

The system as claimed in claim 17 shows further risk limitation by including a maximum value per transaction in a one-way counter based value cryptogram.

Claims 18 and 20 claim Value Accepting Devices for use in a value transfer system using one-way counter based value cryptograms, as defined above.

Claims 19 and 21 claim Value Carrying Devices for use in a value transfer system using one-way counter based value cryptograms, as defined above.

Value Accepting Devices may, advantageously, be implemented as a device with a memory only, for instance, a magnetic-strip card or memory-chip card.

The Value Carrying Devices may be implemented as start cards.

However, alternatively, the Value Carrying Devices and the Value Accepting Devices may be implemented together in an electronic device commonly known as a "wallet".

The invention will be explained with reference to some drawings intended to illustrate and not to limit the scope of the invention.

In the drawings,

FIG. 1 shows an electronic purse system in accordance with the state of the art;

FIG. 2 shows a value transfer protocol between a value carrying device and a value accepting device, in which stored signature cryptography is used;

FIG. 3 shows an alternative value transfer protocol in which a special protective cryptographic aggregate encoding is used.

A value transfer protocol conducted according to the current invention is shown in FIG. 2, which demonstrates its use with a signature carrying cryptographic method to protect the transfer as of example only, other cryptographic protection techniques could be used without any fundamental modification. The Value Carrying Device 1 and the Value Accepting Device 2 may be a smart card and an electronic money accepting terminal, respectively. However, they may alternatively be an electronic money supplying terminal and a smart card, respectively. The Value Carrying Device 1 is shown to contain in addition to a registration of its value represented by the balance 7 a set of stored digital pre-signatures 17a, ... 17d, which have been created by or under control of the Value Guaranteeing Institution 4 in an initialisation protocol conducted at some earlier time for instance as part of the protocol 12 that initialises the balance 7 of the Value Carrying Device 1. Further contained in the Value Carrying Device 1 is a Value Guaranteeing Institution Identification (VGI ID) number 18 to uniquely identify the Value Guaranteeing Institution 4, c.q. its cryptographic public key, and possibly one or more additional cryptographic public.keys to verify signatures as created by other Value Guaranteeing Institutions. The Value Carrying Device 1 also may contain a log of a number of previous value transfer protocols 37a, 37b, 37c, ... each log entry containing at least challenge data 25 received or other such identifying data and a new aggregated value 34 as signed in a transfer by the Value Carrying Device 1.

The Value Accepting Device 2 contains a registration of the total value 28 aggregated over all the previous value transfer protocols it conducted and in which it has accepted value. In a practical realization this total value could be aggregated over a specific period, e.g. since the last time an acquiring protocol was performed by the Value Accepting Device. Also contained in the Value Accepting Device is a cryptographic public key 33a with its associated identification number, abbreviated "VGI PK. ID" in FIG. 2, pertaining to the Value Guaranteeing Institution 4 for which the Value Accepting Device 2 is configured to accept value transfer messages protected with a digital signature. Optional additional cryptographic public keys 33b, 33c, ... may be present to allow acceptance of signatures from multiple different Value Guaranteeing Institutions or possibly, using well known key certification techniques, to allow acceptance of a range of signatures for which the public key is not stored in the Value Accepting Device but obtained from the Value Carrying Device in additional communications. The Value Accepting Device also contains the value transfer transaction data 26a which consists of a digital signature 27 which proves the correctness of its stored aggregated value 28 and any additional data 29 such as the challenge which was used to create the signature 27. A collection 26a, 26b, ... of one or more sets of transaction data may be maintained by the Value Accepting Device 2 for auditing and recovery purposes, or for use in conjunction each with a particular different key.

In the value transfer protocol the message 13 originated by the Value Accepting Device 2 contains at least the amount of the value to be transferred 20, the value 21 aggregated by the Value Accepting Device 2 as copied from the stored number 28, the digital signature 22 protecting the aggregate value 21 as copied from the stored number 28, any optional additional data 24 as copied from the stored data 29 that in addition to the aggregate value 21 Is protected by the signature 22 and that is also needed to allow verification of the signature and some new cryptographic challenge data 25 which will enhance the protection of the current value transfer protocol and in addition may serve to make this instance of the performed protocol uniquely identifiable. Other data may be included in the message for purposes beyond the immediate value transfer protocol, which in part way additionally be protected by the computed signature.

Before producing the proving message 14 the Value Carrying Device 1 performs a signature verification on the received aggregate value 21 using the digital signature 22 and the additional data 24. If the signature is found correct the Value Carrying Device 1 continues to decrease its balance by the amount 20 while adding that same amount to the aggregate value 21, resulting in the new aggregate value 34. It then computes a digital signature to protect the newly computed aggregate value 34 together with the received challenge 25; the signature being computed as appropriate for this particular cryptographic method by using the data stored as the first most stored pre-signature 17a. The used stored presignature is deleted from the Value Carrying Device 1 making the next stored pre-signature 17b available for use in a subsequent value transfer protocol as is customary in stored signature cryptographic protocols. After these computations have been completed the log 37 is updated and the proving message 14 Is send to the Value Accepting Device 2, consisting of the new aggregate value 34 as computed by the Value Carrying Device 1, the newly computed digital signature 35, and the VCI ID number 36 identifying the Value Guaranteeing Institution 4 and its public key. In an alternative embodiment, the aggregate value 34 is not transmitted as it can be computed by the Value Accepting Device. Moreover, the identifying number 36 may have been communicated in an earlier message, The Value Transfer Protocol, as shown in FIG. 2, is completed by the Value Accepting Device 2 in first verifying the received new signature 35 to indeed proof the expected new aggregate value 34 using the appropriate public key 33a, 33b, 33c, . . . as indicated by the received identifying number 36. If the signature is found correct the transaction data 26a is updated in that the stored value of the signature 27 is replaced by the received new signature 35, the stored aggregate value 28 is replaced by the received new aggregate value 34 and the stored additional data 29 is replaced by the challenge 25. As appropriate for the application, before changing these stored values they may have been saved, e.g. in data 26b. After these actions the Value Accepting Device is in its initial state and able to engage in a new value transfer protocol If the proving message 14 is not received or is found to be incorrect it can be retrieved again from the Value Carrying Device upon request by identifying it with the challenge 25 as send in the claiming message 13, where the challenge value is used to locate the entry in the transaction log 37a, 37b, 37c. A duplicate proving message may then be created by digitally signing the data from the log entry and transmitting this data to the requesting Value Accepting Device.

Loss of value in the value transfer protocol, as shown in FIG. 2, is prevented as the computation, of the new aggregate value 34 and the new balance 7 takes place in a single device without any intervening communication and the resulting values are registered in the device memory before they are communicated. For those skilled in the art it is possible to implement the computation and registration as an atomic operation with an unconditionally consistent and predictable result. As the proving message 14, fundamentally, is a cryptographically protected statement that the said computed and stored consistent result has been achieved by the Value Carrying Device it can be repeated without restriction, especially without implying additional transfer of value.

A second embodiment according to the current invention is shown in FIG. 3 where the value transfer protocol is provided with special protective cryptographic aggregate encoding. As shown in FIG. 3, the claiming message 13 contains in addition to the amount 20 the current aggregate value 28 of the Value Accepting Device 2, as a number 38 encoded according to the current invention, which encoding serves as cryptographic protection on the correctness of the aggregate value in a method similar to the signature 22 in the previously described embodiment. Further data included in the claiming message 13 is an encoding seed 39, a number 40, referred to as "Terminal ID", identifying the Value Accepting Device and additional data 41 which by inclusion In the encoding will be cryptographically protected together with the aggregate value 38. Except the amount 20, the data transmitted in the claiming message 13 is copied from the most recent transaction data 26astored in the Value Accepting Device 2 as a result of a previous value transfer protocol 30. Multiple collections of transaction data 26b, 26c, . . . may be present for auditing and recovery purposes and also pertaining to the one or more particular instances of the cryptographic encoding, c.q. pertaining to a particular cryptographic key. The proving message 14 minimally counts an encoding of the resulting new aggregate value 43 of the Value Accepting Device 2 which encoding has been computed by the tamper resistant Value Carrying Device 1 using secret data kept in its memory.

It is an attribute of the encoding according to the embodiment of FIG. 3 that its validity can be checked by performing a publicly known algorithm without knowledge of the secret on which the encoding is based. This public verification is possible whenever its computation is based on an encoding of a value which is less than the value for which the encoding is to be verified. On the other hand, computing an encoding of any value in excess of the largest value known to be encoded in a particular instance of the encoding requires the knowledge of the secret key pertaining to that instance: the encoding exhibits a one-way property, and may serve as a cryptographic signature protecting the correctness of its encoded value. Therefore, the Value Accepting Device 2 having availabie both the old and new aggregate values and their respective encodings after receiving the proving message 14 at the end of the value transfer protocol, can convince itself of the correctness of the received message and in particular of the correctness of the computed new aggregate value encoding before storing the new value and encoding in its memory for use in a subsequent value transfer protocol.

The encoding algorithm is based on repetitive application of a cryptographic one-way computation to an initial random number; algorithms for such computations are known to those skilled in the art and require code words of sufficient length depending on the particular one-way algorithm, e.g. for a one-way function based on the well known DES algorithm, the code words are 64 bits. A theoretical logic number system has been conceived by the mathematician Guiseppe Peano (1858–1932) in which the fundamental set of natural numbers is defined by one first specific element, to be called "zero," and a mathematical function (homomorphisu) that adds one to any natural number; in a similar fashion, the repetitive application of the one-way function to an initial random number can be seen as representing a monotonously incrementing counter starting with the value 0. In this specific counter the integral values it can assume are encoded with the zero value encoded by the initial random number. Due to the one-way characteristics of the cryptographic function, a counter constructed with it is also unidirectional: that is, it is computationally infeasible, starting with an encoding given for a least most value, to compute an encoding of any value less than that encoded in the given encoding.

The uni-directional property of cryptographic one-way counting is the foundation of the cryptographic protection of the aggregate value in the embodiment of the invention according to FIG. 3, Each aggregate value is encoded in a one-way counter (not expressly shown) such that it is computationally infeasible for the Value Accepting Device 2 to compute an encoding for any value in excess of the current aggregate value while it is possible, by applying the publicly known cryptographic one-way function, to compute the encodings of any value less than the current value. The one-way counter (not shown) is (or may be) stored in the Value Accepting Device memory 53 with its maximum value only as the encoding of the present aggregate value. In particular it is possible to compute the difference in value between any of these encodings. Therefore, for any encoding received from the Value Carrying Device 1 as proving message 14 in a value transfer protocol the Value Accepting Device 2 can determine whether the encoding is compatible with the amount transferred and the previous and current aggregate values by computing the difference in value between the encodings. The encoding according to the current invention may further use a maximum for an encoded value, the minimum being encoded by the random number selected as the zero starting value in the cryptographic one-way counter. Then, an encoding is only valid if it represents a value of 0 or more but less than the maximum value set for the encoding. As the encoding is a numeric value of some sufficiently large size, e.g. 64 bits, a very large number of disjunct collections of encodings for the range of counter values is possible; the random selection of the number for the encoding of the maximum value may provide each Value Accepting Device 2 with a unique sequence of encodings of its aggregate value.

To obtain security in the aggregate value encoding, the encoding of the maximum value, the initial random number in the one-way counter, is to be kept confidential exclusively to the Value Carrying Device 1 and possibly to the Value Guaranteeing Institution 4. For instance, this encoding may be contained in a confidentiality cryptogram stored in the Value Accepting Device 2 which is communicated to the Value Carrying Device 1 as part of the claiming message 13, said cryptogram for instance being computed by a secret key stored in the Value Carrying Device 1. The integrity of the starting value of the one-way counter and the associated maximum for the encoded value should, preferably be warranted by an additional cryptographic signature.

The encoding of the aggregate value in the Value Accepting Device 2 may also serve to protect the acquiring protocol 10 in that the Value Accepting Device 2 provides the Acquirer 3 with the encoding of the current value and with the encoding of the value that had been submitted in a previous acquiring protocol; payment can be based on computing the difference in value between the two given encodings provided the previous encoding had been registered with the Acquirer 3 as the very latest encoding received. The very first encoding of a counter, representing a zero value, may be accepted by the Acquirer 3 under any of the cryptographic protection techniques available to those skilled in the art. Alternatively, such first zero valued encoding and its associated cryptographically concealed maximum encoding may have been obtained by the Value Accepting Device 2 in an initial cryptographically authenticated communication from the Acquirer 3, where the Acquirer 3 has obtained said first encoding and concealed maximum under the control of the Value Guaranteeing Institution 14.

An alternative embodiment of the value transfer protocol with protecting encoding according to the current invention is described in FIG. 3 with the starting value of the one-way counter computed by an encryption algorithm with a random secret key referred to as VGI (Value Guaranteeing Institution) key 42 of data stored in the Value Accepting Device 2 and transmitted in the claiming message. Data included in the encryption may include in addition to a random number referred to as encoding seed 39 and a number indicating the maximum encoding value 44 a terminal ID 40 as to uniquely identify the Value Accepting Device and possibly other data 41. Performing said cryptographic algorithm serves possibly with an additional application of a one-way function and adjustment or the bit length a computational method to select the random number that is to serve as the maximum encoding of the aggregate value which by nature of its computation within the confinement of the tamper resistance of the Value Carrying Device 1 is kept confidential for the Value Accepting Device 2 until such time it is as a result of a value transfer protocol communicated to it. In that instance, the encoding of the aggregate value has become exhausted and can no longer be used in further value transfers. A new instance of the encoding must be created, either by requesting it from the Value Carrying Device 1, for instance in a specific preamble to the value transfer protocol, or from the Acquirer 3.

In consequence of the restricted encoding value, the Value Accepting Device 2 will need to have available one or more different encodings of values, in which the encodings have individually or combined sufficient coding space to encode any amount that might be considered for transfer. By nature of the randomness of the maximum value encoding and the relative large number of bits used in code words, a practically unlimited number or distinct instances of the encoding can be found: each instance of the encoding uniquely being characterised by any of its restricted number of valid code words. In this case, the value aggregated in the Value Accepting Device 2 is represented by the sum of the values encoded in the individual cryptographic one-way counters contained in the Value Accepting Device memory 53. If the mount to be transferred is more than the coding of any of the counters would allow for, the transfer protocol can be repeated with additional instances of the encoding. In a more efficient embodiment the individual encoding instances of counters are associated with a weighing factor, such that the total aggregate value is represented by the weighted sum of the individual counters. The weighing factor needs cryptographic protection similar to that for the maximum count of the associated one-way counter such as can be provided by inclusion of a number representing the weighing factor in a confidentiality cryptogram or provided by including It as part or the additional encoding data as input to the cryptogram that serves to compute the maximum value encoding.

What is claimed is:

1. A value transfer system comprising at least one Value Carrying Device (1) and at least one Value Accepting Device (2) being able to communicate with each other the at least one Value Accepting Device (2) comprising a Value Accepting Device memory (53) for storing at least an aggregate value (28) of previous accepted values and being arranged to transfer a claiming message (13) representing at least a transaction value (20) to said at least one Value Carrying Device (1), the at least one Value Carrying Device (1) comprising a Value Carrying Device memory (52) for storing at least a balance value (7) and being arranged to transfer a proving message (14) to said at least one Value Accepting Device (2), characterised in that the at least one Value Accepting Device (2) is arranged to further include into the claiming message (13) a previous aggregate value (21) and a corresponding previously computed proving cryptogram (22);

the at least one Value Carrying Device (1) is arranged to compute End include into the proving message (14) at least one transaction proving cryptogram (35), computed on the basis of the previous aggregate value (21), the corresponding previously computed proving cryptogram (22) and the transaction value (20), and the at least one Value Carrying Device (1) is arranged to compute the at least one transaction proving cryptogram (35) only if it has established the correctness of the received previous aggregate value (21) by using said corresponding previously computed cryptogram (22) and after it has reduced the balance value (7) with the transaction value (20).

2. A value transfer system according to claim 1 further characterised in that it comprises a plurality of Value Carrying Devices (1) which are partitioned into different Value Carrying Device sets by classifying the Value Carrying Devices (1) in accordance with distinct and possibly incompatible ways the at least one transaction proving cryptogram (35) is computed and in that the Value Accepting Device memory (53) is arranged to store value transfer transaction data sets (26a–c) each corresponding to one of said Value Carrying Device sets and including a separate aggregate value (28) with a separate associated proving cryptogram (27) to the effect that the at least one Value Accepting Device (2), upon recognising a Value Carrying Device (1) as pertaining to one of said Value Carrying Device sets, transmits to said Value Carrying Device in the claiming message (13) the separate aggregate value and separate associated proving cryptogram pertaining to the recognised one of said Value Carrying Device sets.

3. A value transfer system according to claim 1 further characterised in that the at least one Value Accepting Device (2) is arranged to include into the claiming message (13):

a number indicating a maximum aggregate value said at least one Value Accepting Device (2) is configured to operate with and a maximum aggregate value cryptogram to proof the correctness of the maximum aggregate value, said maximum aggregate value cryptogram possibly being the same cryptogram as the previously computed proving cryptogram (22), and in that the at least one Value Carrying Device (1) is arranged to complete a value transfer only if it has proved the correctness of the maximum aggregate value permitted for the at least one Value Accepting Device (2) by using said maximum aggregate value cryptogram and after it has established that a new aggregate value (34) that would result from adding the transaction value (20) to the previous aggregate value (21) is less than said maximum aggregate value.

4. A value transfer system according to claim 1 further characterised in that the at least one Value Accepting Device (2) is arranged to include into the claiming message (13):

a transaction value number indicating a maximum transaction value said at least one Value Accepting Device (2) is configured to operate with; and a maximum transaction value cryptogram to proof the correctness of the maximum transaction value, said maximum transaction value cryptogram possibly being the same cryptogram as the previously computed proving cryptogram (22); and in that the at least one Value Carrying Device (1) is arranged to complete a value transfer only if it has proved the correctness of the maximum transaction value permitted for the at least one Value Accepting Device (2) by using said maximum transaction value cryptogram and after it has established that the transaction value (20) is less than said maximum transaction value.

5. A value transfer system according to claim 1 further characterised in that the at least one Value Accepting Device (2) is arranged to include into the claiming message (13).

a transaction number indicating a maximum number of transactions said at least one Value Accepting Device (2) is configured to operate with, a maximum transaction number cryptogram to proof correctness of said maximum number of transactions, said maximum transaction number cryptogram being possibly the same cryptogram as the previously computed proving cryptogram (22), a count of the number of transactions performed at said at least one Value Accepting Device (2), and a count cryptogram to proof correctness of said count, said count cryptogram being possibly the same cryptogram as the previously computed proving cryptogram (22), and in that the at least one Value Carrying Device (1) is arranged to complete a value transfer only if it has proved the correctness of the maximum number of transactions permitted for the at least one Value Accepting Device (1) and the count of the number of transactions performed, respectively, by using said maximum transaction number cryptogram and count cryptogram, respectively, and if it has established that said count is less than said maximum number of transactions and in that when completing the value transfer the at least one Value Carrying Device (1) computes a new transaction count cryptogram for the number of transactions incremented by one and transfers said transaction count cryptogram to the Value Accepting Device as part of the proving message (14).

6. A Value Carrying Device (1) arranged to communicate with at least one Value Accepting Device (2), said Value Carrying Device (1) comprising a Value Carrying Device memory (52) for storing at least a balance value (7) and being arranged to receive a claiming message (13) representing at least a transaction value (20) and to transfer a proving message (14) to said at least one Value Accepting Device (2), characterised in that the Value Carrying Device (10) is arranged to receive through the claiming message (13) a previous aggregate value (21) and a corresponding previously computed proving cryptogram (22);

compute and include into the proving message ( 14) at least one transaction proving cryptogram (35), computed on the basis of the previous aggregate value (21), the corresponding previously computed proving cryptogram (22) and the transaction value (20), and compute the at least one transaction proving cryptogram (35) only if it has established the correctness of the received previous aggregate value (21) by using said corresponding previously computed cryptogram (22) and after it has reduced the balance value (7) with the transaction value (20).

7. A Value Accepting Device (2) arranged to communicate with at least one Value Carrying Device (1), said Value Accepting Device (2) comprising a Value Accepting Device memory (53) for storing at least an aggregate value (28) of previous accepted values and being arranged to transfer a claiming message (13) representing at least a transaction value (20) to said at least one Value Carrying Device (1) and to receive a proving message (14) from said at least one Value Carrying Device (1), characterised in that said Value Accepting Device (2) is arranged to further include into the claiming message (13) a previous aggregate value (21) and a corresponding previously computed proving cryptogram (22) in order to allow the at least one Value Carrying Device (1) to compute and include into the proving message (14) at least one transaction proving cryptogram (35), computed on the basis of the previous aggregate value (21), the corresponding previously computed proving cryptogram (22) and the transaction value (20), and to replace in the Value Accepting Device memory (53) after checking at least one proving cryptogram the new aggregate value and at least one associated proving cryptogram.

8. A value transfer system comprising at least one Value Carrying Device (1) and at least one Value Accepting Device (2) being able to communicate with each other, the at least one Value Accepting Device (2) comprising a Value Accepting Device memory (53) for storing at least an aggregate value (28) of previous accepted values and being arranged to transfer a claiming message (13) representing at least a transaction value (20) to said at least one Value Carrying Device (1), the at least one Value Carrying Device (1) comprising a Value Carrying Device memory (52) for storing at least a balance value (7) and being arranged to transfer a proving message (14) to said at least one Value Accepting Device (2), characterised in that the at least one Value Accepting Device (2) is arranged to further include into the claiming message (13) a cryptographically encoded aggregate value (38);

the Value Accepting Device memory (53) also stores said cryptographically encoded aggregate value (38) which is derived by encoding said aggregate value (28) by using a "Peano" number scheme as follows:

choosing a discrete maximum value for the encoding, selecting a cryptographic one-way function that maps starting numbers consisting of a predetermined number of bits to object numbers consisting of the same predetermined number of bits, a functional application to a number being defined as "successor operation" in the Peano number scheme;

selecting a random number consisting of said predetermined number of bits as zero element in the Peano number scheme;

determining a value encoded in a number by subtracting from said discrete maximum value the value of a Peano number determined by repeated functional applications of the one-way function starting with the zero element until a result of the functional application of the one-way function equals a code number to be decoded, wherein a code word is found not to be a valid encoding if none of the results of applying repetitively for a number of times equal to the chosen discrete maximum value the cryptographic one-way function starting with the selected zero element equals the code word;

the at least one Value Accepting Device (2) is arranged to further include into the claiming message (13) the following data:

said discrete maximum value (44), a zero element cryptogram concealing said zero element in the Peano number scheme, and a correctness cryptogram to proof correctness of said discrete maximum value and said zero element;

the at least one Value Carrying Device (1) is arranged to compute and include into the proving message (14) an encoded new aggregate value (43) computed on the basis of the cryptographically encoded aggregate value (38) and the transaction value (20);

the at least one Value Carrying Device (1) is arranged to complete a value transfer only if it has proved the correctness of said discrete maximum value and said zero element by using the correctness cryptogram, if it determines that, based on said discrete maximum value and said zero element, the cryptographically encoded aggregate value (38) is validly encoded, and, after it has reduced the balance value (7) with the transaction value (20).

9. A value transfer system according to claim 8 characterized in that the at least one Value Carrying Device (1) is arranged, when completing the value transfer, to compute a further correctness cryptogram for proving the correctness of any additional data in the claiming message (13) and, optionally, for protecting said discrete maximum value and said zero element.

10. A value transfer system comprising at least one Value Carrying Device (1) and at least one Value Accepting Device (2) being able to communicate with each other, the at least one Value Accepting Device (2) comprising a Value Accepting Device memory (53) for storing at least an aggregate value (28) of previous accepted values and being arranged to transfer a claiming message (13) representing at least a transaction value (20) to said at least one Value Carrying Device (1), the at least one Value Carrying Device (1) comprising a Value Carrying Device memory (52) for storing at least a balance value (7) and being arranged to transfer a proving message (14) to said at least one Value Accepting Device (2), characterised in that the at least one Value Accepting Device (2) is arranged to further include into the claiming message (13) a cryptographically encoded aggregate value (38);

the Value Accepting Device memory (53) also stores said cryptographically encoded aggregate value (38) which is derived by encoding said aggregate value (28) by using a "Peano" number scheme as follows:

choosing a discrete maximum value for the encoding;

selecting a cryptographic one-way function that maps starting numbers consisting of a predetermined number of bits to object numbers consisting of the same predetermined number of bits, a functional application to a number being defined as "successor operation" in the Peano number scheme;

selecting an encoding seed and appropriate cryptographic derivation algorithm to derive a randomised number consisting of said predetermined number of bits for use as zero element in the Peano number scheme;

determining a value encoded in a number by subtracting from said discrete maximum value the value of a Peano number determined by repeated functional applications of the one-way function starting with the zero element until a result of the functional application of the one-way function equals a code number to be decoded, wherein a code word is found not to be a valid encoding if none of the results of applying repetitively for a number of times equal to the chosen discrete maximum value the cryptographic one-way function starting with the selected zero element equals the code word;

the at least one Value Accepting Device (2) is arranged to further include into the claiming message (13) the following data:
said discrete maximum value,
an encoding seed (39), and
possible additional encoding data (41)

the at least one Value Carrying Device (1) is arranged to compute and include into the proving message (14) an encoded new aggregate value (43) computed on the basis of the cryptographically encoded aggregate value (38) and the transaction value (20);

the at least one Value Carrying Device (1) is arranged to perform the selected derivation algorithm in such fashion that the derived zero element is concealed and to complete a value transfer only
if in using the derivation algorithm it computes the zero element from at least the encoding seed and determines said previous aggregate value as being validly encoded based on said maximum value and said derived zero element, and
after it has reduced the balance value (7) with the transaction value (20).

11. A value transfer system according to claim 8 further characterised in that the at least one Value Accepting Device (2) encodes said aggregate value (28) in a set of one or more encoded sub-values using differently computed Peano number schemes and associated weighing factors, the encoded aggregate value being computed by the weighted sum of the encoded sub-values, such that said encoded sub-values are proportional to the associated weighing factor, said weighing factors optionally being protected either through said correctness cryptogram or said zero element derivation.

12. A value transfer system according to claim 8 further characterised in that it comprises a plurality of Value Carrying Devices (1) which are partitioned into different Value Carrying Device sets by classifying the Value Carrying Devices (1) in accordance with distinct and possibly incompatible ways the cryptographic one-way function, said zero element cryptogram and said correctness cryptogram are computed or said zero element derivation algorithm is performed and in that the Value Accepting Device memory (53) is arranged to store, corresponding to each of said Value Carrying Device sets, a separate aggregate value (28), a separate encoded aggregate value (30) and possibly a separate associated proving cryptogram (27) to the effect that the at least one Value Accepting Device (2), upon recognising a Value Carrying Device (1) as pertaining to one of said Value Carrying Device sets, transmits to said Value Carrying Device in the claiming message (13) the separate aggregate value and associated data pertaining to the recognised one of said Value Carrying Device sets.

13. A value transfer system according to claim 8 further characterised in that the at least one Value Carrying Device memory (52) additionally contains an incremental amount number and in that the at least one Value Accepting Device memory (53) contains a plurality of aggregate values (28) with associated encoded aggregate values (30), associated encoding seeds (31) and associated additional encoding data (32) and in that said system carries out the value transfer in one or more distinct steps, comprising a preparatory value transfer step with a preparatory claiming message (13) and preparatory proving message (14) such that the preparatory claiming message additionally contains data to define at least partially any of the transaction values (20) to be transferred in subsequent steps, followed by a number of related subsequent incremental value transfer steps with claiming messages selected from the following options:

a claiming message containing only a last computed encoded aggregate value;

a claiming message containing only an encoding seed associated to said last computed encoded aggregate value, and a claiming message containing only a unique reference to said last computed encoded aggregate value, each of said incremental value transfer steps including a proving message containing the encoded new aggregate value (43) computed with a transaction value (20) either as received in a previous incremental claiming message or as derived from additional data received in the preparatory claiming message and stored in the at least one Value Carrying Device (1), said incremental value transfer steps possibly taking place with one or more intervening value transfers from the at least one Value Carrying Device (1) with a plurality of Value Accepting Devices including the Value Accepting Device which transmitted the preparatory claiming message such that the latter Value Accepting Device keeps for exclusive use in the incremental value transfer steps the encoded aggregate value and associated data selected from the stored plurality of aggregate values (28) with associated encoded aggregate values (30), associated encoding seeds (31) and associated additional encoding data (32) that had been selected for use in the preparatory value transfer step.

14. A value transfer system according to claim 8 further characterised in that the at least Value Accepting Device (2) is arranged to include into the claiming message a maximum transaction value said at least one Value Accepting Device (2) is configured to operate with, wherein the integrity of said maximum transaction value is protected by said correctness cryptogram and in that the at least one Value Carrying Device (1) is arranged to complete a value transfer only if it proves the correctness of the maximum transaction value permitted for the Value Accepting Device by verifying the last encoded aggregate value and if the transaction value (20) is less than said maximum transaction value.

15. A Value Accepting Device (2) arranged to communicate with at least one Value Carrying Device (1) and comprising a Value Accepting Device memory (53) for storing at least an aggregate value (28) of previous accepted values and being arranged to transfer a claiming message (13) representing at least a transaction value (20) to said at least one Value Carrying Device (1), the Value Accepting Device (2) being arranged to receive a proving message (14) from said at least one Value Carrying Device (1), characterised in that the at least one Value Accepting Device (2) is arranged to further include into the claiming message (13) a cryptographically encoded aggregate value (38);

the Value Accepting Device memory (53) also stores said cryptographically encoded aggregate value (38) which is derived by encoding said aggregate value (28) by using a "Peano" number scheme as follows:

choosing a discrete maximum value for the encoding;

selecting a cryptographic one-way function that maps starting numbers consisting of a predetermined number of bits to object numbers consisting of the same predetermined number of bits, a functional application to a number being defined as "successor operation" in the Peano number scheme;

selecting a random number consisting of said predetermined number of bits as zero element in the Peano number scheme;

determining a value encoded in a number by subtracting from said discrete maximum value the value of a Peano number determined by repeated functional applications of the one-way function starting with the zero element until a result of the functional application of the one-way function equals a code number to be decoded, wherein a code word is found not to be a valid encoding if none of the results of applying repetitively for a number of times equal to the chosen discrete maximum value the cryptographic one-way function starting with the selected zero element equals the code word;

the at least one Value Accepting Device (2) is arranged to further include into the claiming message (13) the following data:

said discrete maximum value (44), a zero element cryptogram concealing said zero element in the Peano number scheme, and a correctness cryptogram to proof correctness of said discrete maximum value and said zero element.

16. A Value Carrying Device (1) arranged to communicate with at least one Value Accepting Device (2) as claimed in claim 15 and arranged to receive a claiming message (13) representing at least a transaction value (20) from said at least one Value Accepting Device (2), the Value Carrying Device (1) comprising a Value Carrying Device memory (52) for storing at least a balance value (7) and being arranged to transfer a proving message (14) to said at least one Value Accepting Device (2), characterised in that the at least one Value Carrying Device (1) is arranged to compute and include into the proving message (14) an encoded new aggregate value (43) computed on the basis of the cryptographically encoded aggregate value (38) and the transaction value (20);

the at least one Value Carrying Device (1) is arranged to complete a value transfer only if it has proved the correctness of said discrete maximum value and said zero element by using the correctness cryptogram, if it determines that, based on said discrete maximum value and said zero element, the cryptographically encoded aggregate value (38) is validly encoded, and after it has reduced the balance value (7) with the transaction value (20).

17. A Value Accepting Device (2) arranged to communicate with at least one Value Carrying Device (1) and comprising a Value Accepting Device memory (53) for storing at least an aggregate value (28) of previous accepted values and being arranged to provide a claiming message (13) representing at least a transaction value (20) to said at least one Value Carrying Device (1), the Value Accepting Device (2) being arranged to receive a proving message (14) from said at least one Value Carrying Device (1), characterised in that the at least one Value Accepting Device (2) is arranged to further include into the claiming message (13) a cryptographically encoded aggregate value (38);

the Value Accepting Device memory (53) also stores said cryptographically encoded aggregate value (38) which is derived by encoding said aggregate value (28) by using a "Peano" number scheme as follows:

choosing a discrete maximum value for the encoding;

selecting a cryptographic one-way function that maps starting numbers consisting of a predetermined number of bits to object numbers consisting of the same predetermined number of bits, a functional application to a number being defined as "successor operation" in the Peano number scheme;

selecting an encoding seed and appropriate cryptographic derivation algorithm to derive a randomised number consisting of said predetermined number of bits for use as zero element in the Peano number scheme;

determining a value encoded in a number by subtracting from said discrete maximum value the value of a Peano number determined by repeated functional applications of the one-way function starting with the zero element until a result of the functional application of the one-way function equals a code number to be decoded, wherein a code word is found not to be a valid encoding if none of the results of applying repetitively for a number of times equal to the chosen discrete maximum value the cryptographic one-way function starting with the selected zero element equals the code word;

the at least one Value Accepting Device (2) is arranged to further include into the claiming message (13) the following data:

said discrete maximum value, an encoding seed (39), and possible additional encoding data (41).

18. A Value Carrying Device (1) arranged to communicate with at least one Value Accepting Device (2) as claimed in claim 17 and arranged to receive a claiming message (13) representing at least a transaction value (20) from said at least one Value Accepting Device (2), the Value Carrying Device (1) comprising a Value Carrying Device memory (52) for storing at least a balance value (7) and being arranged to transfer a proving message (14) to said at least one Value Accepting Device (2), characterised in that the at least one Value Carrying Device (1) is arranged to compute and include into the proving message (14) an encoded new aggregate value (43) computed on the basis of the cryptographically encoded aggregate value (38) and the transaction value (20);

the at least one Value Carrying Device (1) is arranged to perform the selected derivation algorithm in such fashion that the derived zero element is concealed and to complete a value transfer only if in using the derivation algorithm it computes the zero element from at least the encoding seed and determines said previous aggregate value as being validly encoded based on said maximum value and said derived zero element, and after it has reduced the balance value (7) with the transaction value (20).

19. A value transfer system according to claim 1 further characterised in that the at least one Value Accepting Device (2) is implemented as a device with a memory only, for instance, a magnetic-strip card or memory-chip card.

20. A value transfer system according to claim 1 further characterised in that the at least one Value Carrying Device (1) is implemented as a smart card.

21. A value transfer system according to claim 1 further characterised in that the at least one Value Carrying Device (1) and the at least one Value Accepting Device (2) are implemented together in an electronic device commonly known as a "wallet" and in that the wallet comprises a tamper resistant component carrying out functions of the at least one Value Carrying Device (1) arranged to additionally monitor and verify a value transfer from a further Value Carrying Device to the at least one Value Accepting Device (2) and to increment the balance of said at least one Value Carrying Device (1) upon a successful completion of the monitored and verified value transfer.

22. A value transfer system according to claim 1 further characterised in that the at least one Value Accepting Device is arranged to additionally use said at least one transaction proving algorithm (35) as a shared basis for a cryptographic key in a concealment algorithm to be performed on units of electronic information transmitted from the at least one Value Accepting Device to the at least one Value Carrying Device.

23. A value transfer system according to claim 8 further characterised in that the at least one Value Accepting Device is arranged to additionally use said encoded new aggregate value (43) as a shared basis for a cryptographic key in a concealment algorithm to be performed on units of electronic information transmitted from the at least one Value Accepting Device to the at least one Value Carrying Device.

24. A value transfer system according to claim 1 further characterised in that the Value Carrying Device memory (52) comprises said balance (7) represented by a first and a second number, said first number indicating a first total value of available electronic money as received from a Value Guaranteeing Institution (4), said second number indicating a second total value of electronic money as transferred to any Value Accepting Device (2), such that the balance (7) is the numeric difference between said first number and said second number.

25. A value transfer system according to claim 1 further characterized in that it comprises an at least one first and an at least one second Value Carrying Device, the Value Carrying Device memory (52) of said first Value Carrying Device comprising the balance (7) represented by a first and a second number, said first number indicating a first total value of available electronic money as received from a Value Guaranteeing Institution (4), said second number indicating a second total value of electronic money as transferred to any Value Accepting Device (2), such that the balance (7) is the numeric difference between said first number and said second number and said first Value Carrying Device being also arranged to act as a Value Accepting Device storing in its Value Carrying Device memory (52) a previously computed proving cryptogram (22) associated with a previous value transfer, said second Value Carrying Device arranged to perform a value transfer protocol with said first Value Carrying Device and that in said value transfer protocol said first Value Carrying Device includes the claiming message (13) as previous aggregate value (21) the value of a first number representing the balance of said first Value Carrying Device.

* * * * *